United States Patent
Johanson et al.

(10) Patent No.: US 9,637,315 B2
(45) Date of Patent: May 2, 2017

(54) VACUUM CONVEYOR APPARATUS

(71) Applicant: 3M INNOVATIVE PROPERTIES COMPANY, St. Paul, MN (US)

(72) Inventors: Bradley J. Johanson, Chisago City, MN (US); Kevin B. Newhouse, Houlton, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/655,418

(22) PCT Filed: Dec. 27, 2013

(86) PCT No.: PCT/US2013/078000
§ 371 (c)(1),
(2) Date: Jun. 25, 2015

(87) PCT Pub. No.: WO2014/106058
PCT Pub. Date: Jul. 3, 2014

(65) Prior Publication Data
US 2015/0344229 A1    Dec. 3, 2015

Related U.S. Application Data

(60) Provisional application No. 61/746,907, filed on Dec. 28, 2012.

(51) Int. Cl.
*B65G 21/20* (2006.01)
*B65H 29/24* (2006.01)
(Continued)

(52) U.S. Cl.
CPC ........ *B65G 21/2036* (2013.01); *B65G 15/34* (2013.01); *B65G 21/2027* (2013.01);
(Continued)

(58) Field of Classification Search
CPC   B65G 15/34; B65G 21/2036; B65G 21/2027; B65H 2404/281; B65H 2404/563
See application file for complete search history.

(56) References Cited

U.S. PATENT DOCUMENTS 3,308,522 A * 3/1967 Miller ................ B29D 99/0035
101/420
3,592,334 A * 7/1971 Fleischauer ........ B65G 21/2036
198/629
(Continued)

FOREIGN PATENT DOCUMENTS

CN        2437644        7/2001
CN      102815495       12/2012
(Continued)

OTHER PUBLICATIONS

International Search report for PCT International Application No. PCT/US2013/078000 mailed on Apr. 15, 2014, 3 pages.

*Primary Examiner* — Thomas Randazzo
(74) *Attorney, Agent, or Firm* — Robert H. Jordan

(57) ABSTRACT

Conveying apparatus comprising: (1) a conveyor belt comprising a load bearing belt having an exterior surface and an interior surface, the belt having a plurality of channels therethrough, (2) mounting material on the exterior surface of the belt, and (3) a resilient engagement covering. Also a method of using the apparatus in conjunction with means for applying a negative pressure.

11 Claims, 2 Drawing Sheets

(51) Int. Cl.
*B65H 5/22* (2006.01)
*B65G 15/34* (2006.01)

(52) U.S. Cl.
CPC ........... *B65H 5/224* (2013.01); *B65H 29/242* (2013.01); *B65H 2404/232* (2013.01); *B65H 2404/55* (2013.01); *B65H 2404/56* (2013.01)

(56) References Cited

U.S. PATENT DOCUMENTS

| | | | | |
|---|---|---|---|---|
| 4,404,999 | A * | 9/1983 | Woodall, Jr. | D03D 27/00 139/391 |
| 5,699,707 | A | 12/1997 | Campbell, Jr. | |
| 5,857,605 | A * | 1/1999 | Welch | B31F 1/2881 226/170 |
| 6,158,573 | A * | 12/2000 | Janzen | B65G 15/58 198/689.1 |
| 6,283,001 | B1 * | 9/2001 | Schultes | A41H 43/005 83/100 |
| 6,930,063 | B2 * | 8/2005 | Keese | B32B 37/0015 442/101 |
| 7,182,334 | B2 | 2/2007 | Spence et al. | |
| 7,631,745 | B2 * | 12/2009 | Steffen | B41F 17/26 198/377.08 |
| 7,759,266 | B2 * | 7/2010 | Hawkins | B32B 25/10 156/148 |
| 8,066,282 | B2 | 11/2011 | Muller | |
| 8,784,940 | B2 * | 7/2014 | Newhouse | B65H 27/00 427/355 |
| 9,096,405 | B2 * | 8/2015 | Nakano | B65G 47/647 |
| 2012/0064250 | A1 * | 3/2012 | Baccini | B41F 15/20 427/282 |
| 2014/0001014 | A1 * | 1/2014 | Shoji | B65G 15/30 198/846 |

FOREIGN PATENT DOCUMENTS

| | | | | |
|---|---|---|---|---|
| DE | 102009025588 | | 1/2010 | |
| EP | 2112099 | | 10/2009 | |
| GB | 2175237 | | 11/1986 | |
| JP | 2007-008598 | | 1/2007 | |
| WO | WO 2011-038248 | | 3/2011 | |
| WO | WO 2011-038279 | | 3/2011 | |
| WO | WO 2011/038284 | * | 3/2011 | ............ B65H 27/00 |
| WO | WO 2013-102022 | | 7/2013 | |
| WO | WO 2014-035850 | | 3/2014 | |
| WO | WO 2014-055380 | | 4/2014 | |

* cited by examiner

VACUUM CONVEYOR APPARATUS

FIELD

The present invention relates to vacuum conveyor apparatuses, e.g., vacuum conveyor belt devices.

BACKGROUND

Vacuum conveyor belts are widely used for conveying sheets, components, parts, and other work pieces from one place to another in various handling and manufacturing operations. In some cases, the work piece may be operated on, e.g., polished, modified by removal of select portion(s) or addition of supplemental components, etc., while secured to the vacuum conveyor belt.

In order to ensure that articles being conveyed or operated on while secured to the belt, a sufficiently strong vacuum pressure to achieve secure position is typically used. In the course of manipulation of the articles as they are seated on the belt, e.g., positioned in proximity to the belt and subjected to vacuum applied to temporarily position them thereon, conveyed and perhaps operated on while on the belt, and then unseated from the belt, the article may be subjected to shifting of position relative to the surface belt. Such shifting of position may tend to result in damage to the article, particularly in the case of fragile articles, e.g., smooth surfaced optical parts, etc.

The need exists for improved vacuum belts.

SUMMARY

The present invention provides improved vacuum belts and methods for using such belts.

In brief summary, a conveying apparatus of the invention comprises: (1) a conveyor belt comprising a load bearing belt having an exterior surface and an interior surface, the belt having a plurality of channels therethrough, (2) mounting material on the exterior surface of the belt, and (3) a resilient, permeable engagement covering. When operated in conjunction with means for imparting a negative pressure to the interior surface of the belt, a suction draw is impart through the belt so as to hold workpieces thereon. Briefly summarizing, the method of the invention comprises: (1) providing a conveying apparatus of as described herein; (2) providing at least one workpiece; and (3) imparting a negative pressure to the interior surface of the conveyor belt so as to generate a suction draw through the channels; then, in order, (4) positioning the at least one workpiece in proximity to the conveying apparatus such that the suction draw causes the workpiece to seat against the conveying apparatus compressing the resilient engagement covering; (5) conveying the workpiece; and then (6) removing the workpiece from the conveying apparatus.

BRIEF DESCRIPTION OF DRAWING

The invention is further explained with reference to the drawing wherein.

These figures are intended to be merely illustrative and not limiting. The figures are not to scale. Like numbers used in the figures refer to like components.

KEY AND GLOSSARY

Figure 1:
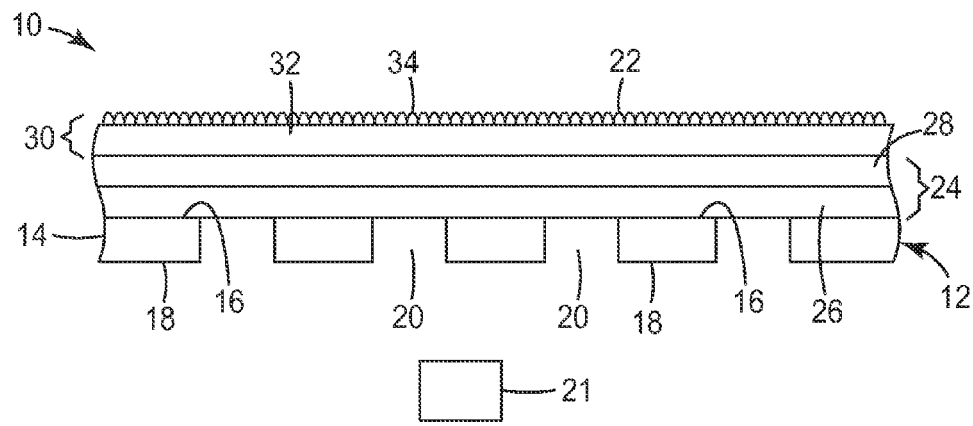
FIG. 1 is a cross sectional view of a portion of an illustrative embodiment of a conveying apparatus of the invention.
Figure 2:
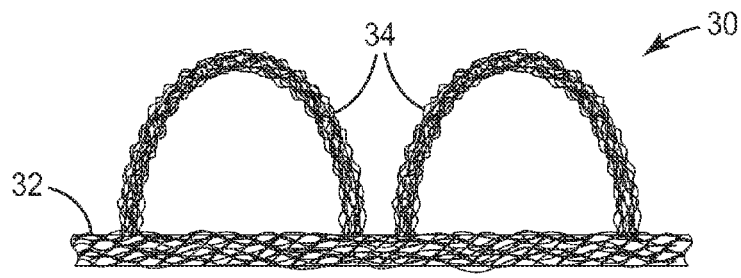
FIG. 2 is cross sectional view of a portion of an illustrative embodiment of engagement covering of a conveying apparatus of the invention; a photograph of a belt with mounting material adhered to a portion of the exterior surface thereof.

For the following defined terms, these definitions shall be applied, unless a different definition is given in the claims or elsewhere in this specification.

"Convey" is used to mean moving an article from a first position to a second position wherein the article is held in contact to the engagement surface of the belt.

"Engagement surface" is the outwardly facing portion of the engagement covering that is directly contacted with an article when the article is conveyed.

"Exterior" is used to refer to the outwardly facing side or face of the belt toward which workpieces will be seated in accordance with the invention. Correspondingly, "interior" is used to refer to the opposite side or face of the belt, i.e., the side to which the negative pressure is applied to draw fluid through the belt securely seating workpieces on the apparatus in accordance with the invention.

"Resilient" is used to refer to the capability of being deformed or compressed and then recovering to earlier shape or loft.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

DETAILED DESCRIPTION OF ILLUSTRATIVE EMBODIMENTS

FIG. 1 shows a cross section of a portion of an illustrative a conveying apparatus 10 of the invention comprising a conveyor belt 12 comprising a load bearing belt 14 having an exterior surface 16 and an interior surface 18, the belt having a plurality of channels 20 therethrough. The apparatus further comprises means 21 for applying a negative pressure to the interior surface 18 of the belt such that air is drawn through channels 20 causing a work piece (not shown) to be seated on the surface 22 of apparatus 10. Apparatus 10 further comprises mounting material 24 on the exterior surface 16. In this embodiment mounting material 24 comprises adhesive layer 26 and mechanical fastening material 28. Apparatus 10 further comprises engagement covering 30 held on the belt by mounting material 24. Engagement covering 30 comprises base layer 32 and resilient looped pile 34 protruding therefrom.

Conveyor Belt

Typically configured in a continuous loop, the conveyor belt provides sufficient strength to be drawn through the conveying operation bearing the load of the belt itself, the resilient engagement covering, and work piece(s) seated thereon in accordance with the invention.

The belt should be sufficiently flexible to permit being drawn around around one or more pulley rolls. Preferably the belt is also sufficiently dimensionally stable to withstand vacuum seating and unseating of workpieces thereon, and conveyance of such workpieces through the desired operation without tending to warp or shift so as to impart surface motion of the belt against the surface of the workpieces, e.g., so as to scratch or mar the surface of the workpieces.

The belt has a plurality of channels therethrough which may be formed by drilling through sheet material or use of materials, e.g., open mesh, fabrics, as the belt. The number of channels should be sufficient to enable secure seating of the workpiece(s) on the belt. Those skilled in the art will be able to readily select suitable number and arrangement of channels, in combination with the negative pressure. For instance, arrays comprising relatively more, closely packed channels may be desired when the invention is to be used with relatively smaller and relatively more delicate pieces, while arrays comprising relatively larger, relatively more distant channels may be suitable for use with workpieces that are larger and more robust and resistant to damage when subjected to the stresses of seating, conveying, and so forth in accordance with the invention. If desired, the array of channels may be uniform across most of the belt. In some instances, the array of channels will be varied across the belt, for instance to provide selective areas of the belt with negative seating pressure and selective areas of the belt which do not impart negative seating pressure.

Suitable permeable conveyor belts can be readily selected by those skilled in the art, with selection dependent in part upon intended operating conditions, e.g., temperature, speed, humidity, dimensions, etc.

Illustrative examples include flexible metal, e.g., steel, stainless steel, etc. belt, flexible elastomers, e.g., rubber, polymer, fiber glass, etc., and flexible textiles, e.g., woven fabrics, Kevlar™ para-aramid fibers, fiberglass, steel cord, etc. In many embodiments, the conveyor belt will comprise two or more layers or components, e.g., a rubber covering on steel mesh core, assembled to provide desired performance characteristics.

Negative Pressure

Suitable means for application of negative pressure to the interior surface of the belt can be readily selected by those skilled in the art with selection dependent in part upon intended operating conditions. Typically, such means as manifold(s) connected to one or more suction pumps, will be employed.

Sufficient negative pressure to securely seat the workpiece(s) on the conveying apparatus during conveying should provided. As will be understood by those skilled in the art, the strength of negative pressure required will be dependent in part upon such factors as the number and arrangement of channels through the belt, the size and weight of the workpieces being conveyed, the direction and orientation of conveyance (e.g., relatively higher pressure typically being required if the workpieces are to be conveyed up or down steep inclines or even seated on the downward facing side of the belt), and so forth.

Seating the workpiece on the conveying apparatus means that the workpiece is held against the engagement cover, by action of the negative pressure and air flow through the channels, such that the workpiece is pulled toward the exterior side or face of the conveying apparatus, compressing the resilient engagement cover, i.e., the resilient looped pile. After conveying, the workpiece is released from its secure seating on the conveying apparatus by reduction of the negative pressure. Upon release and removal of the workpiece, the engagement cover substantially recovers such that subsequent workpieces may be seated thereon. In accordance with the invention, the resilient compression undergone by the engagement cover enables the workpiece to achieve secure seating and be conveyed thereon substantially without undergoing damaging interaction with the surface of the conveying apparatus as is commonly encountered with conventional conveying apparatuses.

The invention employs passage of ambient fluid through the channels to generate the suction force that securely seats the workpiece on the exterior surface of the conveying apparatus. It will be understood that typically the ambient fluid is ambient atmosphere, however, the method may be carried out under inert gas conditions, e.g., nitrogen gas, or other select fluids, e.g., liquid or gas, as desired.

Mounting Material

The mounting material secures the engagement cover to the conveyor belt. Typically, in preferred embodiments, the engagement cover is secured releasably to the conveyor belt. In other embodiments, however, the engagement cover is permanently bonded to the conveyor belt.

In some embodiments, the mounting material is simply adhesive on the exterior surface of the conveyor belt. The adhesive may be in an array of discontinuous segments, e.g., dots, stripes, etc., or may be a substantially continuous array, provided that it does not cover the channels so as to undesirably interfere with the negative pressure needed to permit workpieces to be securely seated on the apparatus.

In some preferred embodiments, the mounting material is a hook fastener that is preferably adhered to the exterior surface of the belt with adhesive such that the hooks protrude to be engaged with the engagement covering.

Such materials provide releasable attachment of the engagement covering with the belt, permitting it to be changed out when worn, for different configurations, etc.

Preferably substantially the entire surface of the belt that is to be covered by the engagement covering is covered with mounting material, with the exception of the channels through the belt in instances where the mounting material is not permeable. This will reduce the tendency of the engagement covering to wrinkle, stretch, or slip during use.

Figure 3:
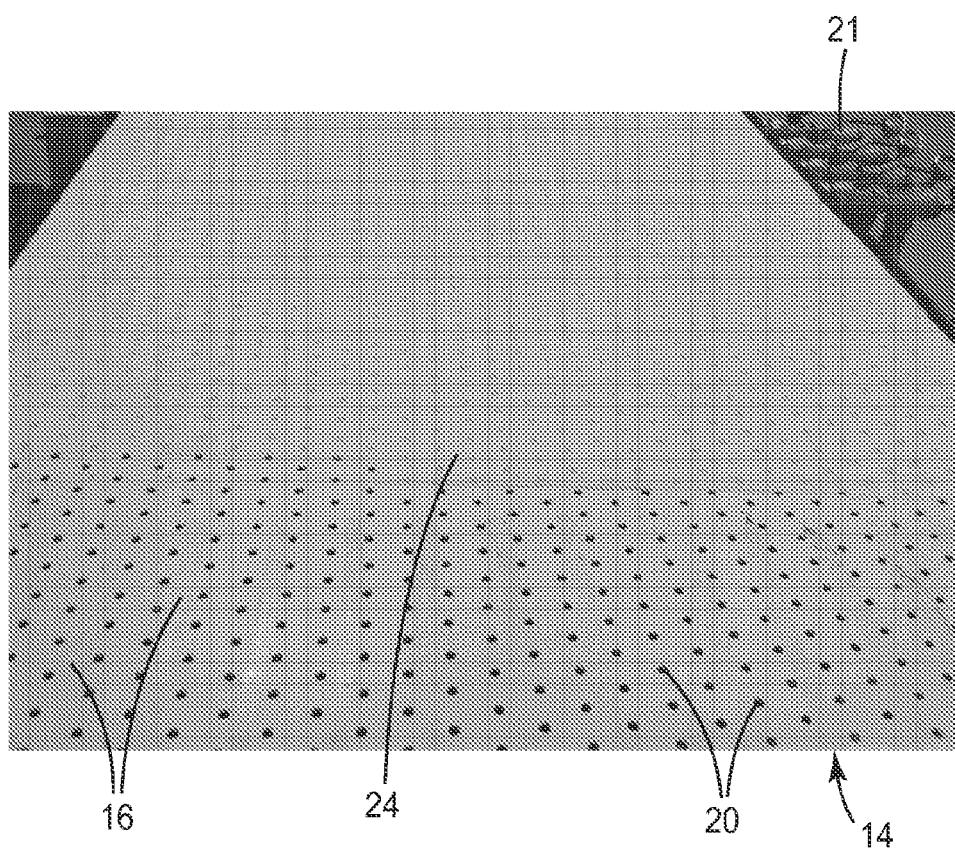
FIG. 3 is a photograph of a portion of an illustrative embodiment of conveying apparatus of the invention.

FIG. 3 is a photograph of a conveyor belt to which mounting material has been applied to a portion of in accordance with the invention. In that view, belt 14 having channels 20 therein is shown, a portion of exterior surface 16 is covered with mounting material 24. In the upper right, pressure lines and valves which are part of the means 21 for providing negative pressure are visible.

Engagement Covering

Resilient engagement coverings useful in the present invention include fabrics having a base layer, e.g., woven, knitted, non-woven, or combination thereof, with a resilient looped pile protruding therefrom.

Illustrative examples of materials that could be used in the present invention have been disclosed in, e.g., PCT Patent Publication Nos. WO 2011/038279, entitled WEB CONVEYANCE METHOD AND APPARATUS USING SAME; WO 2011/038284, entitled METHOD FOR MAKING ENGAGMENT COVER FOR ROLLERS FOR WEB CONVEYANCE APPARATUS; and also in co-pending U.S. patent application Ser. No. 61/694,300, entitled ADAPTABLE WEB SPREADING DEVICE, filed Aug. 29, 2012, and 61/709,430, entitled LOOPED PILE FILM ROLL CORE, filed Oct. 4, 2012.

In a typical embodiment, the engagement covering is made with a knit fabric having a pile-forming loop at every stitch. In an illustrative embodiment there are 25 stitches per inch (1 stitch per millimeter). The fibrous material(s) used to make the fabric may be single filament strands, multifilament strands (e.g., two or more strands wound together to yield a single thread), or combinations thereof.

In many embodiments, the looped pile has a loop height (i.e., dimension from the plane defined by the top of the base layer to the apex of the pile loops) of from about 0.4 to about 0.8 mm, preferably from about 0.5 to about 0.7 mm. It will be understood that engagement covers having looped pile having loop heights outside this range may be used in certain embodiments. If the loop height is insufficient, the cover may fail to provide effective cushioning effect to the article to achieve the full benefits of the invention. If the loop height is too high, the pile may tend to get floppy and undesirably affect article transport or damage the conveyed workpieces, or interfere with maintenance of sufficient negative pressure to maintain the workpieces in securely seated position on the conveying apparatus such that they move about and possibly undergo damage.

The pile should be sufficiently dense to be supportive of the article during conveying so as to reliably achieve the benefits of the disclosure. For instance, the looped pile comprises fibers selected to have an appropriate denier for the application, with thicker fibers providing relatively greater resistance to compression. Illustrative examples include fibers having a denier from about 100 to about 500. As will be understood, fibers having a denier outside this range may be used in some embodiments in accordance with the disclosure.

In illustrative embodiments, the fibers can be selected from the group consisting of poly(tetrafluoroethylene) (PTFE such as, e.g., TEFLON® fiber), aramid (e.g., KEVLAR®), polyester, polypropylene, nylon, wool, bamboo, cotton, or a combination thereof. However, those skilled in the art will be able to readily select other fibers which can be effectively knit and used in covers of the disclosure. The base is typically knit so as to provide the desired properties to permit it to be easily handled and mounted on a belt in accordance with the disclosure.

In many instances, commercially available knit fabrics are made using fibrous materials that have been treated with lubricants to facilitate the knitting process. When the resultant knit fabrics are used in article conveyance operations in accordance with the disclosure, such lubricants may tend to wear away causing variation in frictional performance to the article and potential contamination issues. Accordingly, it is typically preferred to wash or scour fabrics used as engagement covering herein.

The material(s) selected should be compatible with the article materials and operating conditions, e.g., stable and durable under the ambient operating conditions, e.g., temperature, humidity, materials present, etc.

Typically, because of the requirements of the knitting processes used to make them, knit fabrics are made with fibrous materials that have limited elastomeric character so that the fibers can be moved around in contact with one another to form the desired knit. In many instances, lubricants are applied to the fibers to facilitate the knitting process. It is preferred to remove such lubricants from knits used in the present disclosure, e.g., by cleaning or scouring the material such as by washing it before using it. In some instances, the knit can be put into service as an engagement surface of the disclosure with a lubricant being worn away.

Typically it is preferred that the loop pile of the engagement cover provide a coefficient of friction to the workpieces of from about 0.25 to about 2, with about 1.0 or more often being preferred, though engagement covers providing coefficients of friction outside this range may be used if desired.

In some cases, in order to simultaneously achieve desired frictional properties with the article, abrasion resistance, radial modulus of elasticity, and resilience of the loop pile, quantities of selected polymeric relatively elastomeric (as compared to the fibrous pile material(s)) materials can be applied to the engagement surface to form grip enhancement elements that raise the effective COF between the engagement surface and article, if desired.

If desired, apparatus of the invention can be equipped to provide static control by incorporating electrically conductive fibers in the engagement cover and grounding them. For instance, electrically conductive fibers can be selected from metal coated fibers such as aluminum, silver, copper or alloys thereof; metal fibers such as aluminum, silver, copper, or alloys thereof; carbon fibers, or a combination thereof. In one particular embodiment, a conductive polyester fiber such as RESISTAT® P6203 Polyester Filament (from Jarden Applied Materials, Columbia S.C.) can be used. In some cases, the electrically conductive fibers have a length that includes kinks, bumps, ends or a combination thereof, that form pointed conductive regions. The electrically conductive fibers can comprise a fiber having a size (diameter) ranging from about 3 microns to about 20 microns, although other size fibers can also be used. In some cases, the electrically conductive fibers comprise a plurality of ends, and are intertwined in electrical contact throughout the resilient engagement surface.

Method of Use

In accordance with the invention, a workpiece is conveyed by: (1) providing a conveying apparatus as described herein; (2) providing at least one workpiece; and (3) imparting a negative pressure to the interior surface of the conveyor belt so as to generate a suction draw through the channels; then, in order, (4) positioning the at least one workpiece in proximity to the conveying apparatus such that the suction draw causes the workpiece to seat against the conveying apparatus compressing the resilient engagement covering; (5) conveying the workpiece; and then (6) removing the workpiece from the conveying apparatus.

In some embodiments, the method entails more than simply conveying the workpiece, i.e., the method further comprises modifying the workpiece while the workpiece is securely seated to the conveying apparatus, i.e., between the steps of (4) positioning and (6) removing described above. For instance, the workpiece may be treated, partially trimmed, have additional component members or materials applied thereto, etc.

In accordance with the invention, the path of conveyance may entail moving the workpiece substantially horizontally, e.g., with the workpiece seated on top of the conveying apparatus such that in addition to the negative pressure gravity helps maintain the workpiece in its seated position. In many embodiments, the path of conveyance will entail other orientations, including conveying the workpiece in upward or downward directions, at steep, e.g., 90° angles, or even inverted such that negative pressure must overcome the force of gravity upon the workpiece to maintain it in seated position on the conveying apparatus.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom. The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

Aspects of the invention can be claimed as:

1. A conveying apparatus comprising: (1) a conveyor belt comprising a load bearing belt having an exterior surface and an interior surface, the belt having a plurality of channels therethrough, (2) mounting material on the exterior surface of the belt, and (3) a resilient engagement covering.

2. The apparatus of claim 1 wherein the mounting material is a fastener with protruding hooks engaged with the resilient engagement covering.

3. The apparatus of claim 1 wherein the mounting material is bonded to the exterior surface of the belt with adhesive.

4. The apparatus of claim 1 further comprising means for imparting a negative pressure to the interior surface of the belt.

5. The apparatus of claim 1 wherein the resilient engagement covering is a knit fabric comprising a base layer having first and second faces and a resilient looped pile protruding from the first face.

6. The apparatus of claim 5 wherein the base layer comprises a woven base layer, a knitted base layer, a non-woven base layer, or a combination thereof.

7. The apparatus of claim 5 wherein the resilient looped pile comprises a fibrous material selected from poly(tetrafluoroethylene), aramid, polyester, polypropylene, polyethylene, nylon, wool, bamboo, cotton, or a combination thereof.

8. The apparatus of claim 5 wherein the resilient looped pile comprises a fiber having a size ranging from about 35 denier to about 400 denier.

9. The apparatus of claim 5 wherein the resilient looped pile comprises loops having a height from about 0.25 mm to about 5 mm.

10. A method for conveying a workpiece comprising: (1) providing a conveying apparatus of claim 1; (2) providing at least one workpiece; and (3) imparting a negative pressure to the interior surface of the conveyor belt so as to generate a suction draw through the channels; then, in order, (4) positioning the at least one workpiece in proximity to the conveying apparatus such that the suction draw causes the workpiece to seat against the conveying apparatus compressing the resilient engagement covering; (5) conveying the workpiece; and then (6) removing the workpiece from the conveying apparatus.

11. The method of claim 10 further comprising modifying the workpiece between the steps of (4) positioning and (6) removing.

* * * * *

UNITED STATES PATENT AND TRADEMARK OFFICE
CERTIFICATE OF CORRECTION

| | | |
|---|---|---|
| PATENT NO. | : 9,637,315 B2 | Page 1 of 1 |
| APPLICATION NO. | : 14/655418 | |
| DATED | : May 2, 2017 | |
| INVENTOR(S) | : Bradley Johanson et al. | |

It is certified that error appears in the above-identified patent and that said Letters Patent is hereby corrected as shown below:

In the Specification

<u>Column 3</u>
Line 37, Delete "around around" and insert -- around --, therefor.

<u>Column 4</u>
Line 18, Delete "provided." and insert -- be provided. --, therefor.

<u>Column 5</u>
Line 27, Delete "ENGAGMENT" and insert -- ENGAGEMENT --, therefor.

Signed and Sealed this
Ninth Day of January, 2018

Joseph Matal
*Performing the Functions and Duties of the
Under Secretary of Commerce for Intellectual Property and
Director of the United States Patent and Trademark Office*